United States Patent [19]

Chabonat

[11] 4,210,299
[45] Jul. 1, 1980

[54] PROPULSIVE LIFTING ROTORS

[76] Inventor: Marcel Chabonat, 4, Villa Etienne Mulot, 78000 Versailles, France

[21] Appl. No.: 863,626

[22] Filed: Dec. 23, 1977

[30] Foreign Application Priority Data

Dec. 27, 1976 [FR] France ................. 76 39820

[51] Int. Cl.² .............. B64C 27/00; B64C 29/00; B64C 39/00
[52] U.S. Cl. ................................. 244/20; 244/9; 416/111; 416/139
[58] Field of Search ............... 244/12.1, 9, 10, 11, 244/19, 20, 21, 22, 45 A; 416/111, 119, 139 R, 140, 141; 74/568, 325

[56] References Cited

U.S. PATENT DOCUMENTS

| 1,894,081 | 1/1933 | Brooks | 416/111 |
| 2,413,460 | 12/1946 | Main | 244/9 |
| 3,001,418 | 9/1961 | Nectoux | 74/568 |
| 3,938,759 | 2/1976 | Bastide | 244/9 |
| 4,048,947 | 9/1977 | Sicard | 416/111 |

FOREIGN PATENT DOCUMENTS

| 76436 | 12/1917 | Fed. Rep. of Germany | 244/20 |
| 646545 | 11/1928 | France | 244/20 |
| 2309401 | 11/1976 | France | 244/20 |
| 269620 | 4/1927 | United Kingdom | 244/20 |
| 477395 | 12/1937 | United Kingdom | 244/45 A |
| 747172 | 3/1956 | United Kingdom | 244/20 |

Primary Examiner—Galen L. Barefoot
Attorney, Agent, or Firm—Karl F. Ross

[57] ABSTRACT

A propulsive lifting rotor for an aircraft comprises two wings pivotally mounted about axes parallel to their leading edges. The wings (rotary airfoils) are located at respective sides of a plane at right angles to the rotor axis.

6 Claims, 12 Drawing Figures

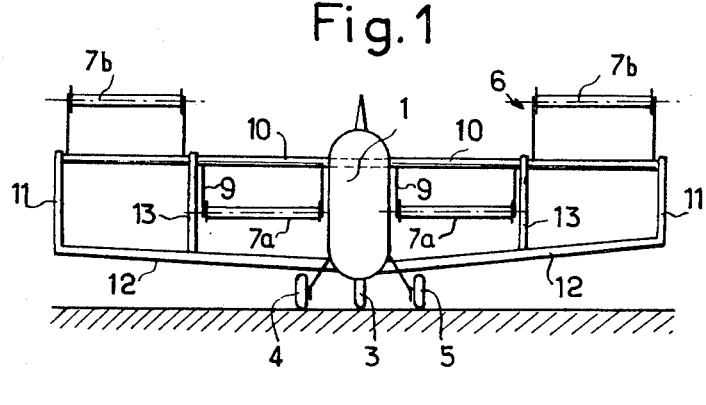
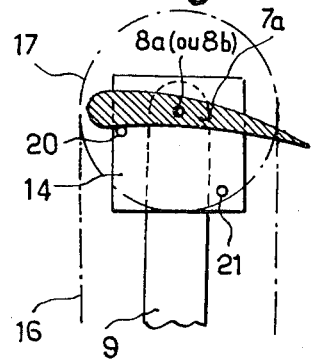
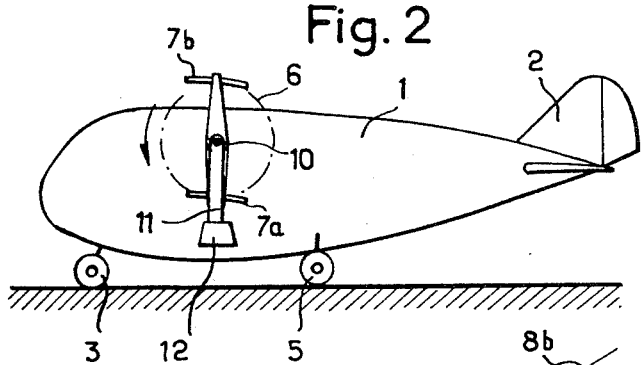
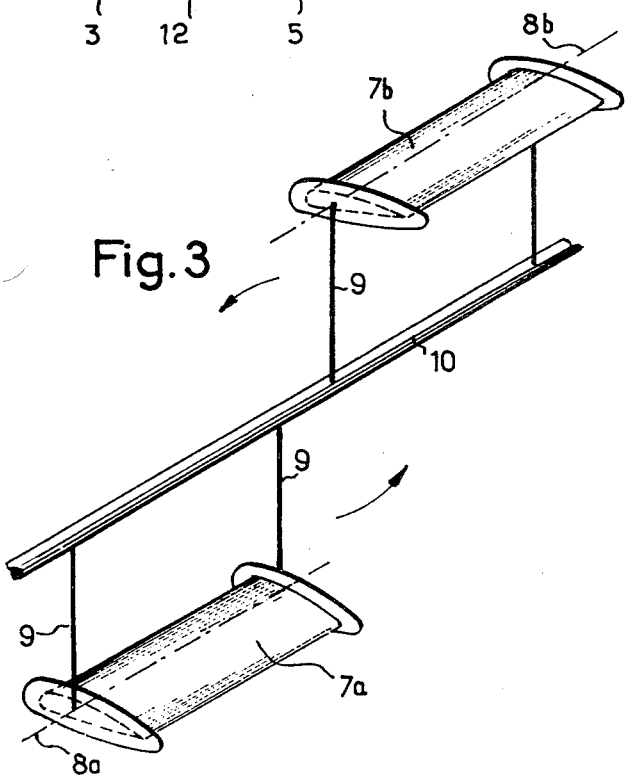
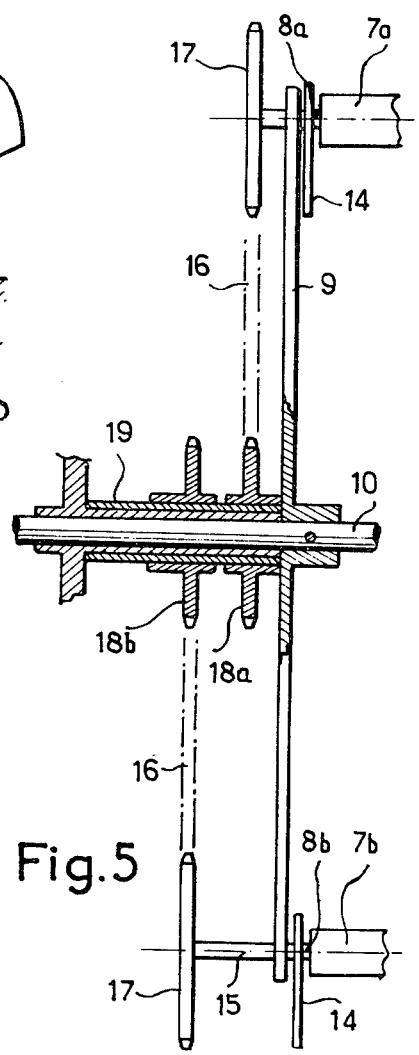

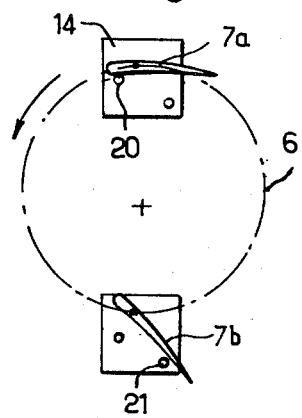
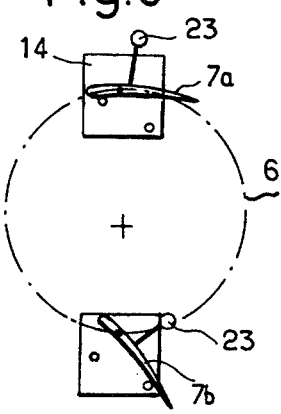
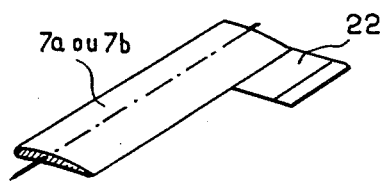
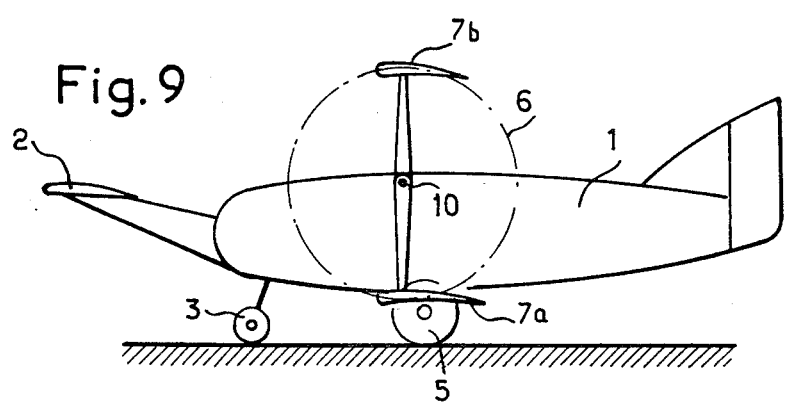
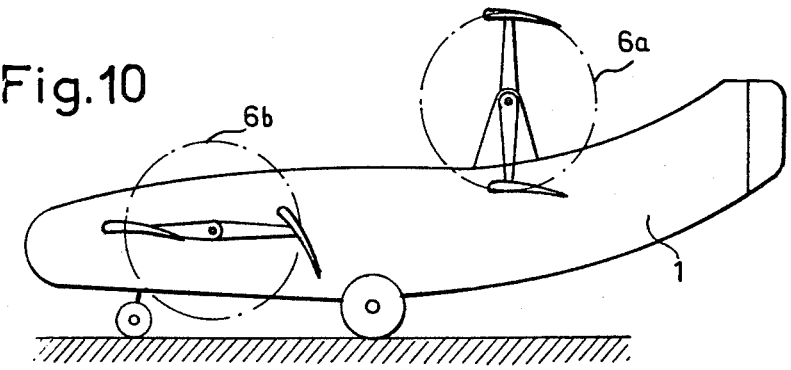

PROPULSIVE LIFTING ROTORS

BACKGROUND OF THE INVENTION

1. Field of the Invention

The present invention relates to propulsive lifting rotors.

2. Description of the Prior Art

There have been proposed propulsive lifting rotors comprising two streamlined wings each of which may pivot about an axis internally of the wing and parallel to its leading edge.

SUMMARY OF THE INVENTION

According to the invention, there is provided a propulsive lifting rotor comprising a rotary drive shaft, arms rigid with the drive shaft, two streamlined wings, (rotary airfoils) and pivot means pivotally mounting the wings on the arms such that each wing can pivot about an axis parallel to the leading edge of the wing and located internally of the wing, the airfoils being located at respective sides of a plane at right angles to the drive shaft.

Further according to the invention, there is provided a propulsion and lifting rotor for an aircraft, rotor comprising two diametrically opposed wings of aerofoil section located at respective sides of a plane at right angles to the rotor axis, and means mounting each said wing for pivotal movement about a respective axis spaced from the axis of the rotor and lying parallel to the leading edge of the wing.

In one preferred embodiment of the invention, each of the wings is journalled to pivot freely about its axis on a support linked to the shaft of the rotor in such manner as to retain a practically constant angular position, and stops are incorporated to limit the pivotal displacement of the wing with respect to its support. The thrust of the air acting on the wing impresses on the same, during rotation of the rotor, an automatic and cyclic variation of the angle of incidence which improves the efficiency of the rotor.

To assure this automatic variation of the angle of incidence, each wing may carry, at the rear, a flap of small width, coupled rigidly to the wing. It may also comprise a counterweight situated above the wing. The action of the centrifugal forces exerted on the counterweight is complementary to the thrust of the air on the wing, which loses incidence in downward displacement and gains incidence during upward displacement.

In another preferred embodiment, devices controlled by a cam carried by a shaft parallel to the rotor shaft are provided to change the angle of incidence of the wings in positive and cyclic manner. The cam preferably forms part of a set of cams keyed slidably on the cam-carrying shaft. By displacing the set of cams, it is then possible to modify the pattern of incidence variation as a function of the speed of flight.

In the case of an aircraft comprising a fuselage and two rotors arranged at either side of the fuselage, the elevator assembly may be positioned at the front with respect to the rotors. Thus, the elevator assembly will not be situated within the wash of the rotors. The rotors may be offset longitudinally and situated at different levels.

BRIEF DESCRIPTION OF THE DRAWINGS

Embodiments of the invention will now be described, by way of example only, with reference to the accompanying diagrammatic drawings, in which:

FIG. 1 is a front elevation of an aircraft equipped with rotors in accordance with the invention;

FIG. 2 is a side elevation of the aircraft;

FIG. 3 is a view in perspective of one of the rotors of the aircraft;

FIG. 4 shows the manner in which a wing of the rotor is mounted;

FIG. 5 shows means for moving supports for the wings so that the supports remain in a constant angular position during rotation of the rotor;

FIG. 6 shows schematically the cyclic variation in the angle of incidence of the wings;

FIG. 7 shows in perspective, a flap secured to the trailing edge of the wing;

FIG. 8 is a view similar to FIG. 6, of a modified arrangement;

FIG. 9 is a side elevation similar to FIG. 2, but showing a modified form of aircraft;

FIG. 10 is a side elevation similar to FIG. 2, but showing a modified arrangement of the rotors;

DESCRIPTION OF THE PREFERRED EMBODIMENTS

Figures 11, 12:
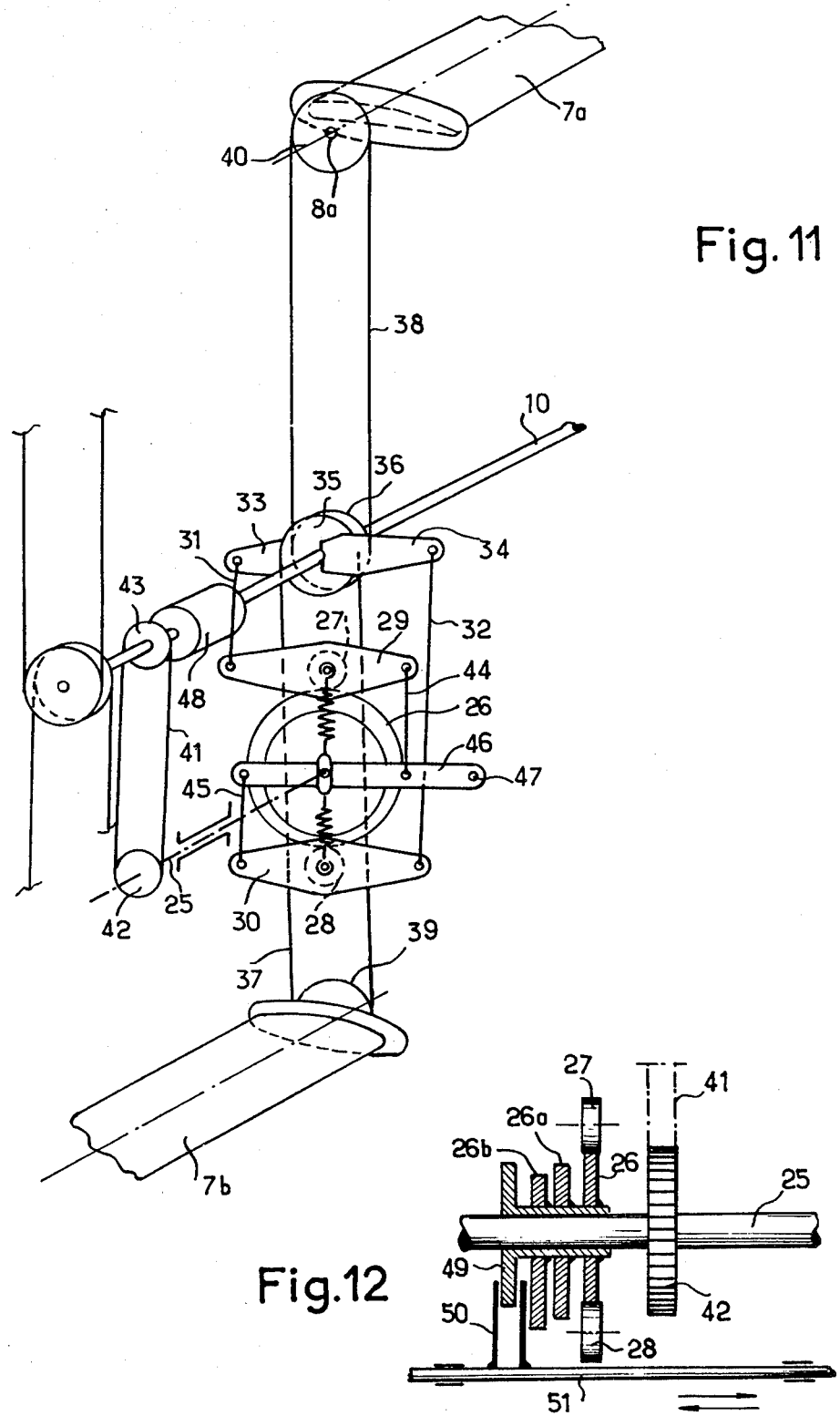
FIG. 11 is a schematic perspective view of a system for positively varying the angle of incidence of the wings of the rotors.
FIG. 12 shows a set of displaceable cams for use in the system of FIG. 11.

There is shown in FIGS. 1 and 2 an aircraft or "aerodyne" comprising a fuselage 1 with a conventional rudder and elevator assembly 2, and an undercarriage of the tricycle type having a front wheel 3 and two rear wheels 4 and 5. The conventional wings are replaced in this case by two co-axial lift and propulsion rotors 6.

The two rotors 6 are symmetrical with respect to the vertical longitudinal central plane of the aircraft, and are identical. Each rotor comprises two streamlined wings 7a and 7b of aerofoil section each mounted to pivot around a spindle 8a or 8b lying within the section and parallel to its leading edge, each spindle extending between two radial arms 9 secured on a rotary driving shaft 10 perpendicularly to the central plane of the aircraft. The two wings 7a and 7b are situated at respective sides of a plane, parallel to the driving shaft 10.

Each end portion of the shaft 10 is carried by a vertical arm 11 secured on the outer extremity of a small robust wing 12 of aerofoil section inset in the base of the fuselage 1. The shaft 10 is also supported between the individual wings 7a and 7b of each pair of wings, by an intermediate bearing carried by an arm 13.

In the embodiment of FIGS. 4 and 5, each of the spindles 8a and 8b is arranged as a function of the $Cm_o$ of the section of the wing and is carried, at each end, by a small plate 14 which is pivotally arranged in the arms 9, around the spindle 8a or 8b. A toothed belt 16 passes over a toothed pulley 17 secured on a shaft 15 as well as over a toothed pulley 18a or 18b coaxial with the shaft 10. The two toothed pulleys 18a and 18b are keyed on a stationary sleeve 19 which acts as a bearing for the shaft 10. Under these conditions, when the shaft 10 rotates while entraining the arms 9, the plates 14 pivot with respect to these arms and remain parallel to themselves; in other words each plate remains in a constant angular orientation during rotation of the rotor.

Each small plate 14 carries a resilient stop 20 limiting the downwards pivotal movement of the wing 7a or 7b, in a position in which the angle of incidence of the wing is relatively small or even negative. It also carries a second resilient stop 21 limiting upwards pivotal movement of the wing.

As shown in FIG. 6, when a wing, for example a wing 7a, begins its downwards movement during rotation of the shaft 10, the resulting aerodynamic forces cause the wing to pivot downwardly, this movement being limited by the stop 20. Similarly, when the wing begins its upward movement during rotation of the shaft 10, it pivots upwards and assumes a positive angle of incidence, which however corresponds to zero lift of the wing; its displacement is limited if applicable, by the stop 21.

In the embodiment shown in FIG. 7, each wing 7a or 7b is equipped at the rear with a flap 22 of small width, connected rigidly to the wing. This flap ensures that the wing will assume the incidence required, when the shaft 10 is rotated.

In the embodiment shown in FIG. 8, each wing 7a or 7b carries a counterweight 23 situated at a predetermined distance above the wing. Under the action of the centrifugal forces acting on the counterweight, the wing tends to pivot and to engage the stop 20 or 21.

FIG. 9 shows an embodiment in which an elevator assembly 2 is situated in front of the fuselage 1 so that the elevator assembly is not positioned in the wash of the rotor 6, as occurs when the elevator assembly is positioned in a conventional position at the rear of the fuselage.

In the embodiment of FIG. 10, the two rotors 6a and 6b are offset longitudinally. The rear rotor 6a is placed at a higher level than the forward rotor 6b in order to be positioned outside its wash.

Instead of varying automatically the angle of incidence of the wings 7a and 7b as occurs in the embodiments of FIGS. 4 to 8, this may be controlled in a positive manner. For this purpose it is possible to incorporate, as illustrated in FIG. 11, a camshaft 25 parallel to the shaft 10 and carrying a cam 26 which co-operates via diametrically opposed rollers 27 and 28 with two rocking levers 29 and 30. The levers 29 and 30 are connected by connecting rods 31 and 32, respectively, to two arms 33 and 34 secured on two pulleys 35 and 36 freely mounted on the shaft 10. Two toothed belts 37 and 38, respectively pass over these pulleys and over two other pulleys 39 and 40 mounted, respectively, on the spindles 8a and 8b of the wings 7a and 7b, the camshaft 25 being connected to the shaft 10 via a toothed belt 41 and two pulleys 42 and 43 of the same diameter. The levers 29 and 30 are also connected, via connecting rods 44 and 45, to a lever 46 journalled pivotally about an axis 47 which may be stationary or adjustable. The reference 48 denotes the driving motor of the shaft 10.

While operating, the motor 48 drives the shaft 10 and causes the rotor to turn. If the levers 33 and 34 were to remain stationary, the belts 37 and 38 would cause the spindles 8a and 8b to pivot in such a manner that the wings 7a and 7b would remain parallel to themselves. The displacement of the shaft 10 is however transmitted to the shaft 25, so that the two shafts rotate synchronously, at the same angular speed. The rotating cam 26 causes the levers 29 and 30 to pivot and this movement is transmitted to the levers 33 and 34. The angle of incidence of the wings 7a and 7b is thus varied cyclically and in particular the angle is changed rapidly during movement through the top and bottom dead center of rotation.

As shown in FIG. 12, the cam 26 may be one of a set of cams carried by a sleeve 49 which is slidably keyed on the shaft 25. A selector 50 which is secured on a rod 51 parallel to the shaft 25 and displaceable along its axis, renders it possible to displace the sleeve 49 and thus to replace the cam 26 by another cam 26a or 26b. During this action, the rollers 27 and 28 will have been displaced outwards by means which are not illustrated. Due to this system, it is possible to adapt the incidence variation to the flight conditions (take-off, climb, cruise flight, descent or landing) which permits optimum use of the propulsive power.

In modified arrangements (not shown) the rotors may be located at the front of the fuselage, with a supporting wing being provided at the rear.

In the rotors particularly described, by locating the two wings at respective sides of a plane at ring angles to the rotor axis, interaction which would otherwise have been caused by the passage of one wing of the rotor through the wake of the preceding wing, can be avoided.

What is claimed is:

1. A rotary-airfoil aircraft comprising:
   a fuselage having a vertical longitudinal median plane;
   a pair of rotors mounted on said fuselage symmetric on opposite sides of the median plane and rotatable about respective axes substantially transverse to said plane, each of said rotors comprising:
   a drive shaft transverse to said median plane and rotatable about the respective axis,
   a first pair of arms extending radially from said shaft and axially spaced about it therealong by a distance less than the length of said shaft over a first section thereof,
   a single first airfoil spanning said first pair of arms and rotatable angularly relative to said first pair of arms about a first airfoil axis parallel to the leading edge of the first airfoil,
   a second pair of arms extending radially from said shaft in a direction and spaced apart by a distance less than the length of said shaft while being angularly offset about the axis of said shaft with respect to the first pair of arms, said second pair of arms bracketing a second section of said shaft axially offset from said first section,
   a single second airfoil spanning said second pair of arms and being angularly displaceable relative thereto about a second airfoil axis parallel to the leading edge of said second airfoil, said first and second airfoils lying exclusively to opposite sides of a respective plane of the respective rotor parallel to the median plane and perpendicular to said shaft, said first and second airfoils being the exclusive airfoils along said first and second sections of said shaft; and
   means for driving said shafts, thereby rotating said rotors so that each airfoil describes an orbit about the respective shaft axis free from encounter with a wake from any other airfoil of the respective motor.

2. The aircraft defined in claim 1, further comprising support means for each of said airfoils, means for maintaining the support means in a substantially constant angular orientation during rotation of the respective rotor, and stop means carried by the support means for limiting the extent of angular displacement of each airfoil about the respective airfoil axis.

3. The aircraft defined in claim 1, further comprising a flap of limited width formed in the trailing edge of each of said airfoils.

4. The aircraft defined in claim 1, further comprising counterweight means on each of said rotors above each of said airfoils.

5. The aircraft defined in claim 1, further comprising means for pivoting the airfoils of each rotor for pivotably varying the angle of incidence of each airfoil cyclically, the pivoting means comprising shaft means extending parallel to the respective drive shaft, a cam carried by the shaft means and linkage means controlled by the cam for pivoting the airfoils and changing the angle of incidence rapidly during passage of each airfoil through respective top and bottom deadcenter positions, said cam forming one of a plurality of cams selectively shiftable into operation along said shaft means.

6. The aircraft defined in claim 1 wherein said rotors are located with axes offset longitudinally of the fuselage and at different heights.

* * * * *